Aug. 27, 1946.  D. S. FOOTE  2,406,535
MIXING MACHINE
Filed June 14, 1944  2 Sheets-Sheet 2
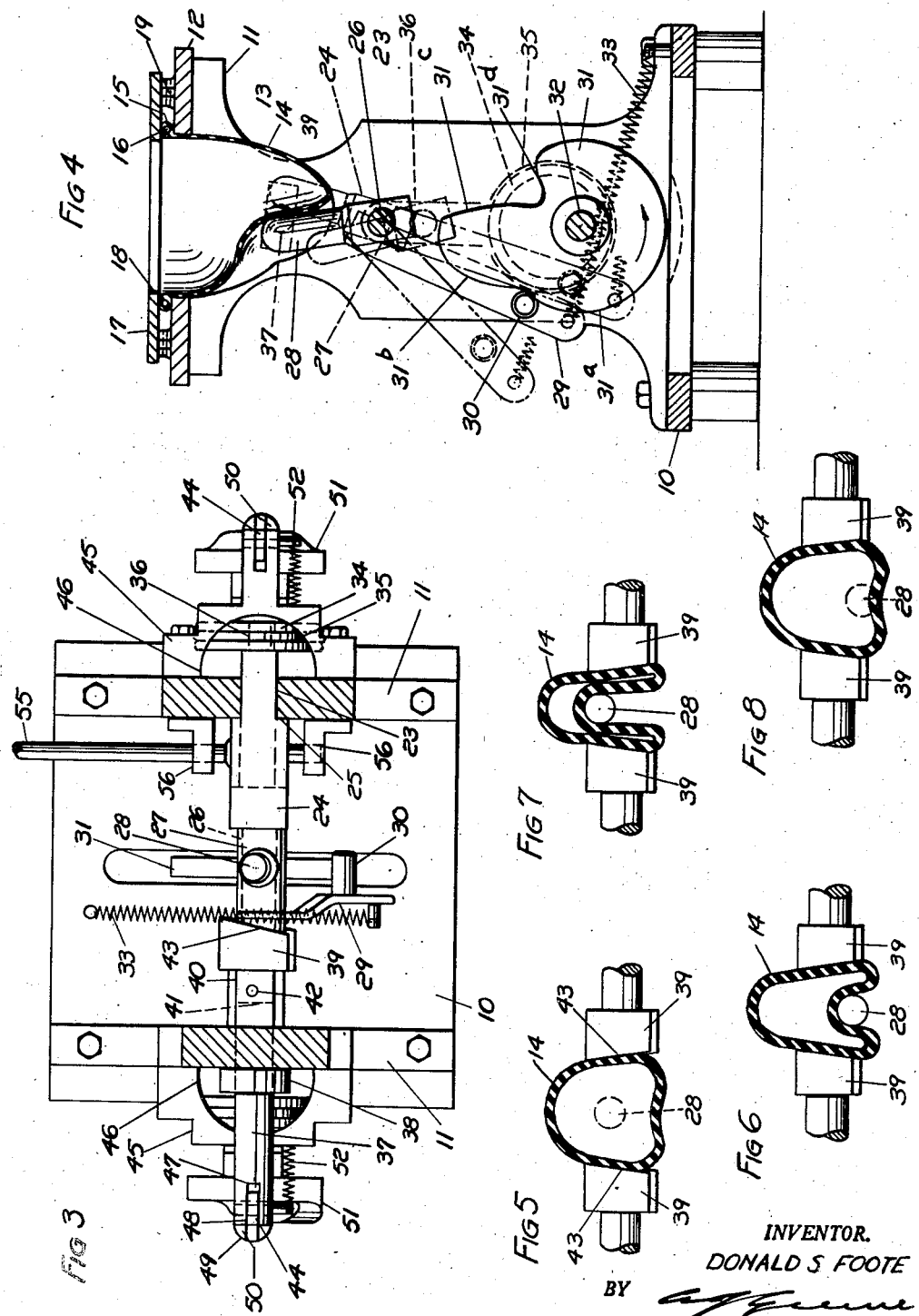
INVENTOR.
DONALD S. FOOTE
BY
John H. Lewis Jr.
ATTORNEYS Patented Aug. 27, 1946

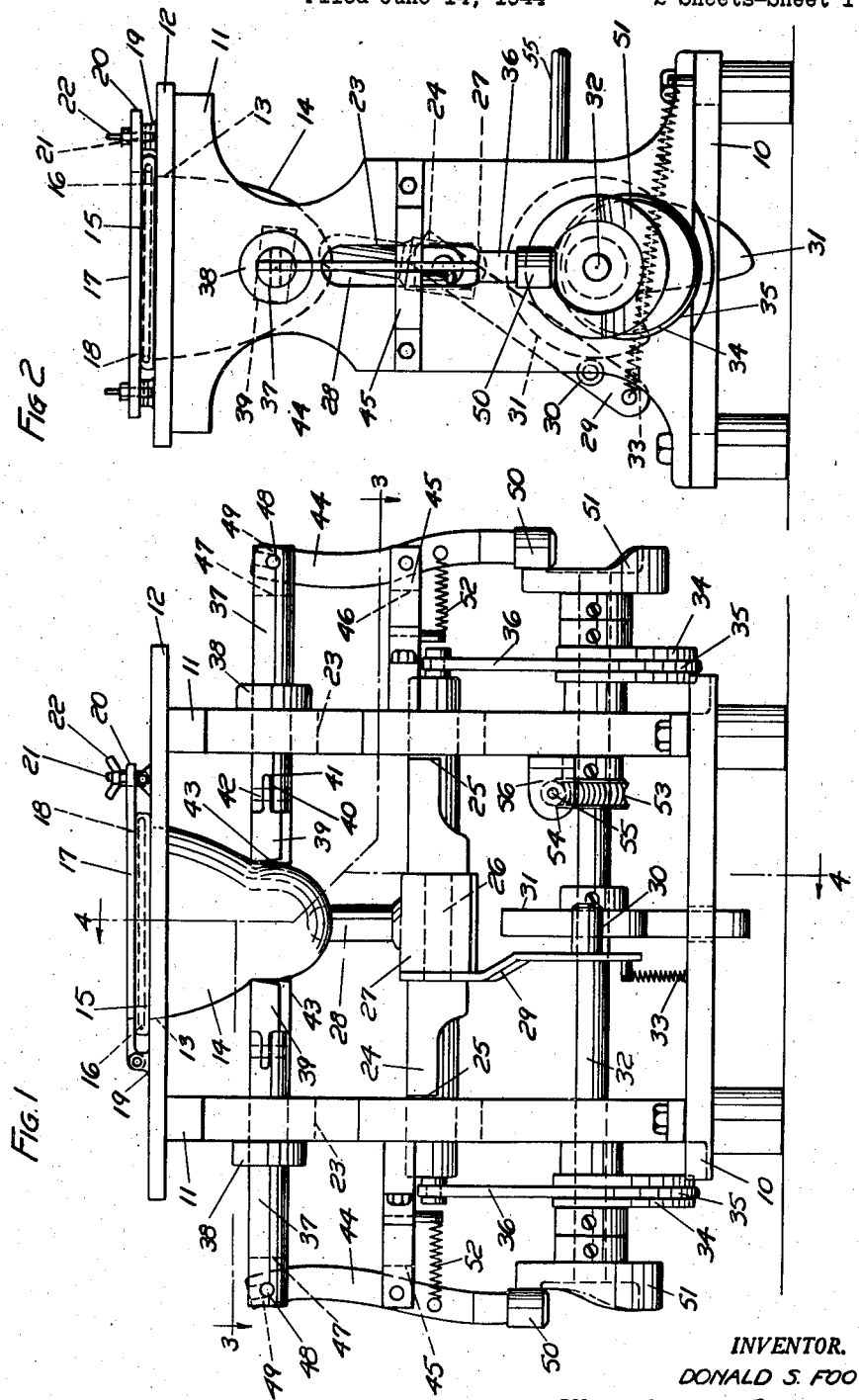

2,406,535

UNITED STATES PATENT OFFICE 2,406,535

MIXING MACHINE

Donald S. Foote, Kansas City, Mo., assignor to Remington Arms Company, Inc., Bridgeport, Conn., a corporation of Delaware Application June 14, 1944, Serial No. 540,216

4 Claims. (Cl. 259—72)

The present invention relates to a mixing apparatus, particularly for mixing several ingredients, and wherein such ingredients, usually in pulverulent form, are of different specific gravities and in widely different proportions. While the apparatus may be used for the mixing of various substances, it is especially adapted for the mixing of an explosive mixture such as an ammunition primer mixture. Such primer mixtures usually include a burning substance, a binding substance, and a highly explosive fulminating substance, the latter usually being a very small percentage of the entire mixture. The ingredients are preferably mixed in a wet state, and in this case it is essential that the mass of ingredients be thoroughly blended by a kneading action. Because of the dangerous character of the material, it is the usual practice to mix the ingredients in a suitably barricaded structure by remote control, the usual type of mechanical mixer comprising agitator or mixing elements movable in the mixing receptacle in direct contact with the contents, a procedure involving considerable danger from exposion, as well as inconvenience and hazard in removing the mixture and cleaning the apparatus.

It is an object of the invention to provide a mixing apparatus wherein the ingredients of the mixture are placed in an imperforate flexible receptacle, and wherein external agitating elements having reciprocal and rubbing movements cooperate with the receptacle to impart a kneading action to the contents to thoroughly mix and blend them.

A further object is to provide an apparatus wherein the mixing receptacle is removably mounted in the apparatus, so that it may serve as the portable container for handling the completed mixture as it is carried from the mixing apparatus to its point of use, it being proposed to provide a number of interchangeable receptacles, so that as soon as one is removed to be used as a handling container, another containing a new charge of ingredients may be placed within the apparatus.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a front elevation of a mixing apparatus, according to the illustrated exemplary embodiment of the invention.

Fig. 2 is an end elevation.

Fig. 3 is a sectional plan view, taken along the line 3—3 of Fig. 1, the receptacle being removed.

Fig. 4 is a vertical sectional view, taken along the line 4—4 of Fig. 1, and showing the mixing elements in a relatively moved position from that illustrated in Fig. 1, the long dot-and-dash lines and the short dot-and-dash lines respectively showing further relatively moved positions.

Figs. 5 to 8 are diagrammatical views showing several successive positions of the mixing elements relative to the receptacle, the latter being shown in horizontal section.

Similar reference characters indicate corresponding parts throughout the several figures of the drawings.

Referring to the drawings, the mixing apparatus, according to the illustrated exemplary embodiment of the invention, comprises a frame consisting of a raised platform base 10, a pair of vertical standards 11—11, and a horizontal top plate 12 mounted upon the upper ends of the standards. The top plate is provided centrally with a circular opening 13 in which is engaged the mixing receptacle 14 in the form of an imperforate flexible bowl, preferably formed of rubber or the like, and of substantially conoidal shape. At its upper wide end the bowl is provided with a projecting rim 15 having embedded in it a stiffening ring 16, which provides a resilient flange, adapted to seat upon the upper side of the table 12, as well as a means for maintaining the circular form of the bowl while it is being handled. The bowl is retained in the opening 13 by means of a rectangular clamping plate 17, provided centrally with a circular opening 18 in register with the opening 13, and hingedly mounted on the plate 12 by means of a hinge connection 19 at one edge. At its opposite edge the plate is provided with slotted lugs 20 adapted to be engaged by hingedly mounted clamping screws 21, provided with wing nuts 22 which upon being tightened securely clamp the rim 15 of the bowl between the table and the clamping plate. The bowl hangs below the table 12 where it is adapted to be externally engaged by the mixing elements, presently to be more fully described.

In each of the standards 11 there is provided a vertical slot 23 in which are engaged the end arm portions of a vertically slidable crosshead 24, these arm portions being shouldered, as at 25, to engage at the inner sides of the standards to retain the crosshead against longitudinal displacement. Centrally of the crosshead there is provided a shaft portion 26 upon which is rotatably engaged a block member 27 provided at its upper side with an upwardly projecting plunger element 28. To one side of the block 27 there is secured a lever arm 29 projecting downwardly and forwardly therefrom and provided with a cam roller 30 riding upon a cam 31 secured upon a horizontal cam shaft 32 journaled in the standards 11. The roller 30 is yieldably held in engagement with the cam by a spring 33 connected between the end of the lever 29 and the base 10. This cam is designed to impart swinging movement to the plunger 28, coincidentally with raising and lowering movement imparted to it by the vertical sliding movement of the crosshead. For this latter purpose eccentric drive elements are provided upon the cam shaft 32 outwardly of the standards 11, each consisting of an eccentric sheave 34 secured to the shaft and engaged by the circular strap end 35 at the lower end of a connecting arm 36, the upper ends of the connecting arms at each side being pivotally connected to the ends of the crosshead projecting through the slots 23.

The plunger 28 is disposed in the central vertical plane of the bowl 19 in such arrangement that in its lowered position it engages the lower end of the bowl, slightly indenting it. Upon a horizontal axis extending longitudinally through the lower portion of the bowl at a point intermediate the lowered and raised positions of the plunger 28 there are provided at opposed sides of the bowl reciprocating slide rods 37, each mounted in bearing bushings 38 provided in the standards 11. Carried upon the inner end of each of these slide rods is a bowl engaging pusher element 39, provided with a mortise projection 40 engaged in a transverse slot 41 in the end of the rod and secured thereto by a pin 42. Each of the pusher elements is provided with a rectangular bowl engaging face 43, and is tilted downwardly to dispose the bowl engaging face in a downwardly and rearwardly inclined direction. The bowl engaging face is also inclined inwardly toward the rear. This arrangement of the bowl engaging faces provides a downwardly and rearwardly inclined converging passage for cooperation with the vertically moving and swinging plunger 28, as will hereinafter more fully appear.

Horizontal reciprocation is imparted to the rods 37 by means of rock levers 44—44 pivotally mounted upon brackets 45—45 secured to the respective standards 11—11, these brackets having clearance openings 46 therein through which the ends of the crosshead 24 are adapted to move during its vertical reciprocation. The upper end of each of the rock levers 44 is engaged in a slot 47 in the end of each of the rods 37, and is pivotally connected thereto by means of a pin 48 engaged in a slot 49 in the end of the lever. Upon the lower end of each rock lever there is provided a cam engaging roller 50, riding upon a cam 51 secured upon the end of the cam shaft 32, the roller being held in engagement with the cam surface by a spring 52 connected between the rock lever and the bracket 45.

Rotation is imparted to the cam shaft by means of a worm gear 53 and pinion 54, the latter being carried by a shaft 55 mounted in brackets 56 secured to the inner side of one of the standards 11. This shaft is driven by any suitable means, preferably a motor located at a remote point.

The operation is as follows:

In the lowered position of the crosshead 24, as illustrated in Figs. 1 and 2, the horizontally reciprocating pusher elements 39 are in their outwardly moved positions with their face surfaces 43 engaged at opposed sides of the bowl. In this position the vertically movable plunger 28 engages the lower end of the bowl, pressing it upwardly to a slight extent so that the rearward portion of the bowl extends downwardly behind the end of the plunger while the forward portion extends upwardly in front of it. The rearwardly converging inclined faces 43 of the pusher elements 39 compress the sides of the bowl to an increased extent toward the rear, so that it projects rearwardly to a slightly greater extent than forwardly, and as shown diagrammatically in Fig. 5. The crosshead 24 is moved upwardly by means of the eccentric drive elements 34, and at the same time the cam 31 rotates to the point shown in Fig. 4 where the roller 36 is at the end of the concentric portion 31ª of the cam 31 and is about to be engaged by the projecting rise 31ᵇ thereof.

As the crosshead rises simultaneously with the riding of the roller 36 over the concentric portion of the cam a forward swinging movement is imparted to the plunger 28, bringing it from the slightly rearwardly inclined position shown in Fig. 2 to the forwardly inclined position shown in Figs. 4 and 6. Simultaneously with the raising of the crosshead, the cams 51 are rotated to points where the slide rods 37 carrying the pusher elements 39 are moved inwardly, the right hand cam 51 being preferably arranged as shown in advance of the left hand cam, so that the right hand pusher element is moved inwardly in advance of the inward movement of the left hand pusher element, as shown in Fig. 6. The inward movement of the right hand pusher element is completed substantially at the same time that the plunger 28 reaches its upper forwardly swung position.

As the roller 36 rides upon the rise 31ᵇ of the cam 31 the plunger 28 is swung rearwardly to the position shown in Fig. 7, and by the long dot-and-dash lines in Fig. 4. During this movement the right hand pusher element remains in its inwardly moved position and at the same time the left hand pusher element completes its inward movement, with the result that the ingredients in the bowl are given a differential kneading action at each side of the plunger 28 through its passage between the primarily inwardly moved right hand pusher element, and the secondarily inwardly moved left hand pusher element, their opposed converging faces causing the mixture to be gradually squeezed with increasing force as the plunger swings rearwardly, and this squeezing action being started at the right hand side slightly in advance of the left hand side.

As the roller 36 leaves the rise 31 and rides over the steep decline surface 31ᶜ, the crosshead 24 is quickly moved downwardly to a point slightly above its lowermost position, causing the plunger 28 to swing forwardly to the position shown in Fig. 8, and by the short dot-and-dash lines in Fig. 4, this action taking place while the pusher elements move outwardly, the right hand pusher element moving outwardly slightly in advance of the left hand pusher element, so that there is a differential squeezing action at each side of the plunger 28 during this movement. Thereupon the roller 36 rides upwardly upon the sharp rise portion 31ᵈ of the cam 31 to its starting position, this action taking place during the terminal portion of the downward movement of the crosshead and causing the plunger 28 to swing from the position shown by the short dot-and-dash lines in Fig. 4 to the slightly rearwardly inclined starting position shown in Fig. 2.

The form of the invention illustrated in the drawings and described herein is typical and illustrative only, and it is evident that the invention is capable of embodiments in other forms, all falling within the scope of the appended claims, which are to be broadly construed.

What is claimed is:

1. In a mixing apparatus, a support, a flexible mixing receptacle supported therein, a reciprocating mixing element arranged to engage the end of said receptacle exteriorly, reciprocating mixing elements arranged to engage opposed sides of said receptacle exteriorly, a reciprocating crosshead on which said end engaging mixing element is pivotally mounted for swinging movement, and cam means for imparting swinging movement to said end engaging mixing element coincidentally with its reciprocating movement, said side engaging mixing elements providing a contracting and expanding transverse passage through which said end engaging mixing element is adapted to have reciprocal and swinging movement, and whereby the contents of said receptacle are squeezed between the pressed sides and the pressed end of said receptacle with a kneading action.

2. In a mixing apparatus, a support, a flexible mixing receptacle supported therein and disposed in a substantially vertical hanging position, a vertically reciprocating plunger element arranged to engage the lower end of said receptacle exteriorly, horizontally reciprocating pusher elements arranged to engage opposed sides of said receptacle exteriorly, a vertically reciprocating crosshead on which said plunger element is pivotally mounted for swinging movement about a horizontal axis, and cam means for imparting swinging movement to said plunger element coincidentally with its vertical reciprocating movement, said pusher elements providing a contracting and expanding transverse passage through which said plunger element is adapted to have reciprocal and swinging movement, and whereby the contents of said receptacle are squeezed between the horizontally pressed sides and the vertically pressed end of said receptacle with a kneading action.

3. In a mixing apparatus, a support, a flexible mixing receptacle supported therein and disposed in a substantially vertical hanging position, a vertically reciprocating crosshead, a plunger element pivotally carried thereby for swinging movement coincidentally with its vertical reciprocating movement and arranged to engage the lower end of said receptacle exteriorly, and a pair of horizontally reciprocating pusher elements arranged to engage opposed sides of said receptacle exteriorly, said pusher elements having convergent and inclined receptacle engaging faces providing a contracting and expanding transverse passage through which said plunger element is adapted to have reciprocal and swinging movement, and means for imparting reciprocating movement to said pusher elements one in advance of the other, whereby the contents of said receptacle are squeezed between the horizontally pressed sides and the vertically pressed end of said receptacle with a kneading action.

4. In a mixing apparatus, a support, a flexible mixing receptacle supported therein and disposed in a substantially vertical hanging position, a main shaft, a vertically reciprocable crosshead, cam means on said shaft to reciprocate said crosshead, a plunger element pivotally carried by said crosshead for swinging movement coincidentally with its vertical reciprocating movement and arranged to engage the lower end of said receptacle exteriorly, a cam on said main shaft for swinging said plunger, a pair of horizontally reciprocating pusher elements arranged to engage opposed sides of said receptacle exteriorly, said pusher elements having convergent and inclined receptacle engaging faces providing a contracting and expanding transverse passage through which said plunger is adapted to have reciprocal and swinging movement, and cam means mounted on opposite ends of said shaft for imparting reciprocating movement to said pusher elements one in advance of the other, whereby the contents of said receptacle are squeezed between the horizontally pressed sides and the vertically pressed end of said receptacle with a kneading action.

DONALD S. FOOTE.